Figure 1:
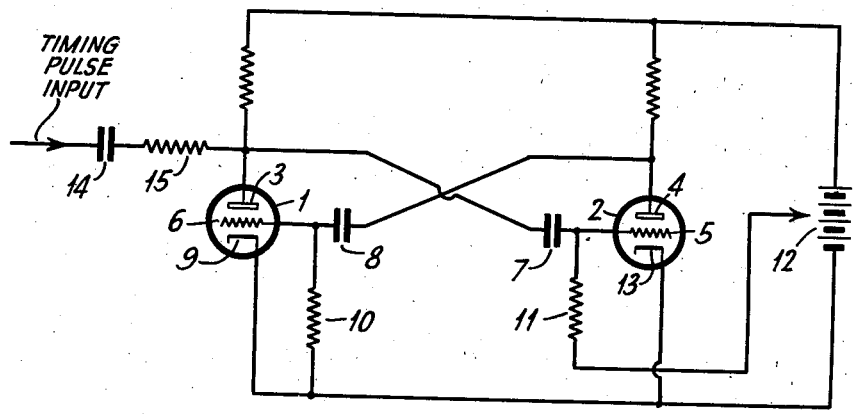

Dec. 16, 1941.   E. L. C. WHITE   2,266,526
ELECTRICAL OSCILLATION GENERATOR
Filed April 11, 1939   3 Sheets-Sheet 1

TIMING PULSE

ANODE POTENTIAL OF TUBE 1

ANODE POTENTIAL OF TUBE 2

INVENTOR.
E.L.C. WHITE
BY   H.S. Grover
ATTORNEY.

Dec. 16, 1941.   E. L. C. WHITE   2,266,526
ELECTRICAL OSCILLATION GENERATOR
Filed April 11, 1939   3 Sheets-Sheet 2

INVENTOR.
E.L.C. WHITE
BY
ATTORNEY.

Patented Dec. 16, 1941

2,266,526

UNITED STATES PATENT OFFICE 2,266,526

ELECTRICAL OSCILLATION GENERATOR

Eric Lawrence Casling White, Hillingdon, England, assignor to Electric & Musical Industries Limited, Hayes, England, a company of Great Britain Application April 11, 1939, Serial No. 267,307
In Great Britain April 11, 1938

4 Claims. (Cl. 250—36)

This invention relates to generators of electrical oscillations of the kind known as multivibrators and of the kind which are arranged to be controlled by timing pulses.

In the specification of British Patent No. 456,840 a multivibrator circuit comprising a pair of valves is described, wherein in the usual manner the anodes are cross-connected by capacities to the opposite grids, the grids being connected to their respective cathodes by means of resistances, and in which the time constants of the resistance-capacity combinations are so chosen that short duration pulses appear at the anodes of the two valves. These pulses are of opposite sign and ocur in synchronism with controlling impulses applied to one of the valves. At the more positive parts of the wave-form the shape of the pulses is of a purely rectangular form, but in more negative parts there exist undesired excursions. On the anode of the valve to which controlling impulses are applied the excursion is due to these controlling impulses. In the case of the opposite valve, the excursion is due to this grid being driven momentarily positive, corresponding to the termination of the negative pulse on the opposite anode.

The excursions may be removed from either wave-form by means of a subsequent valve or valves whose function is to limit the wave-form or wave-forms in a negative direction. Where, however, the employment of the least equipment is of importance, this course is not desirable, and it is an object of the present invention to achieve purely rectangular pulse wave-forms devoid of undesired excursions, without resort to an additional valve or valves.

According to one feature of the invention a multivibrator oscillation generator is provided for the production of pulses of a substantially rectangular wave-form and arranged to be controlled by suitable timing pulses comprising a pair of thermionic valves, the time constant associated with the control electrode of one of said valves having a value large compared with the period of said wave-form, the wave-form of potential applied to said control electrode associated with said long time constant possessing an undesired excursion after the transition in this wave-form which occurs in a negative direction, wherein for the purpose of obtaining an output substantially free from said undesired excursion said valve is provided with an impedance connected in its cathode circuit, said output being derived from said impedance.

According to another feature of the invention a multi-vibrator oscillation generator is provided for the production of pulses of a substantially rectangular wave-form and arranged to be controlled by suitable timing pulses comprising a pair of thermionic valves the time constant associated with the control electrode of one of said valves having a value large compared with the period of said wave-form, and said timing pulses are applied to the anode of this valve, the wave-form of potential on the anode of said valve possessing an undesired excursion due to the end of the timing pulse after the transition in this wave-form which occurs in a negative direction, wherein for the purpose of obtaining an output substantially free from said undesired excursion, said valve having the long time constant circuit associated with its control electrode comprises a valve in which an additional electrode is provided in the electron stream between the control electrode and anode and said output is obtained from said additional electrode.

According to yet another feature of the invention a multi-vibrator oscillation generator is provided for the production of pulses of a substantially rectangular wave-form and arranged to be controlled by suitable timing pulses comprising a pair of thermionic valves, the time constant associated with the control electrode of one of said valves having a value large compared with the period of said wave-form, the wave-form of potential applied to said control electrode associated with said long time constant possessing an undesired excursion after the transition in this wave-form which occurs in a negative direction, wherein for the purpose of obtaining an output substantially free from said undesired excursion, said timing pulses are applied directly to the valve associated with the shorter time constant and to an additional electrode of that valve arranged in the electron stream between the electrode to which the shorter time constant circuit is connected and the anode and the output is derived from the anode of the valve associated with the longer time constant.

Figure 2A:
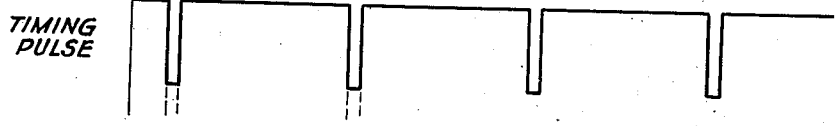
Figure 2B:
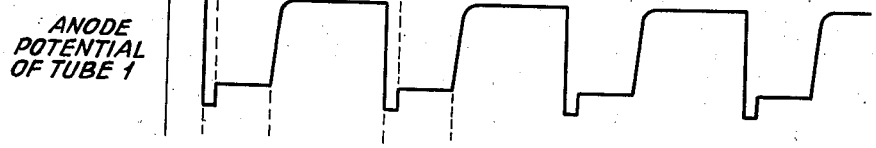
Figure 2C:
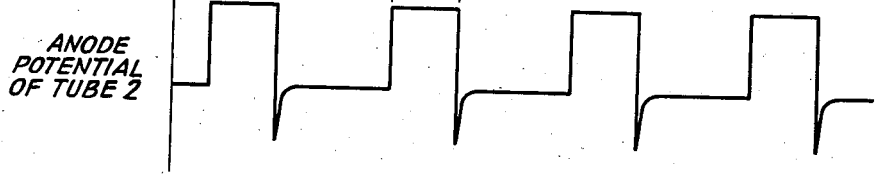
Figure 3:
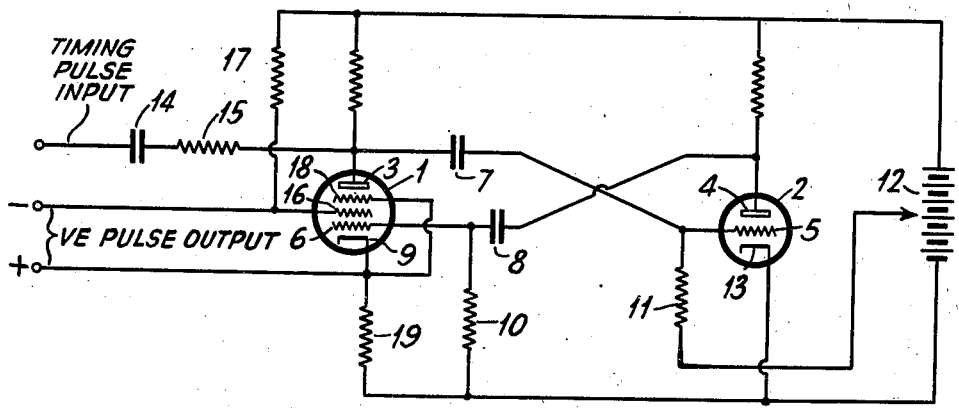
Figure 4A:
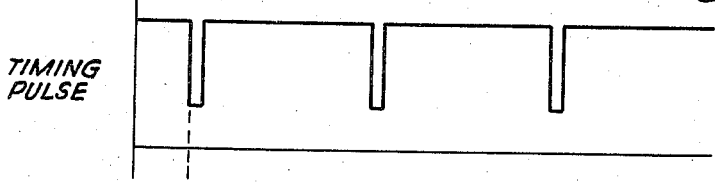
Figure 4B:
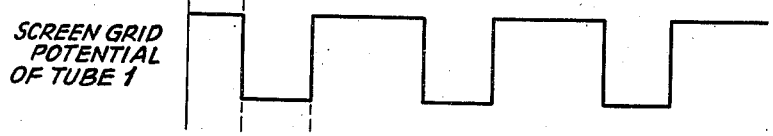
Figure 4C:
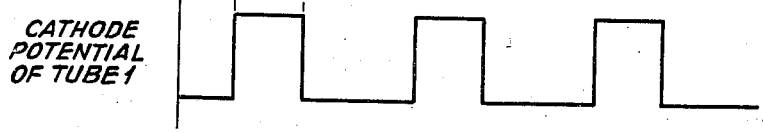

In order that the nature of the invention may be more clearly understood an arrangement operating in accordance therewith will now be described, by way of example, with reference to the accompanying drawings, in which:

Figure 1 illustrates a controlled multivibrator circuit of known form in which short duration pulses are produced, but with associated undesired excursions, Figures 2a, 2b and 2c show the controlling impulses applied to the multivibrator of Figure 1 and the pulse wave-forms that are derived at the two anodes, Figure 3 illustrates a multivibrator circuit in accordance with the invention, and Figures 4a, 4b and 4c show the waveforms associated with this circuit.

Figure 5:
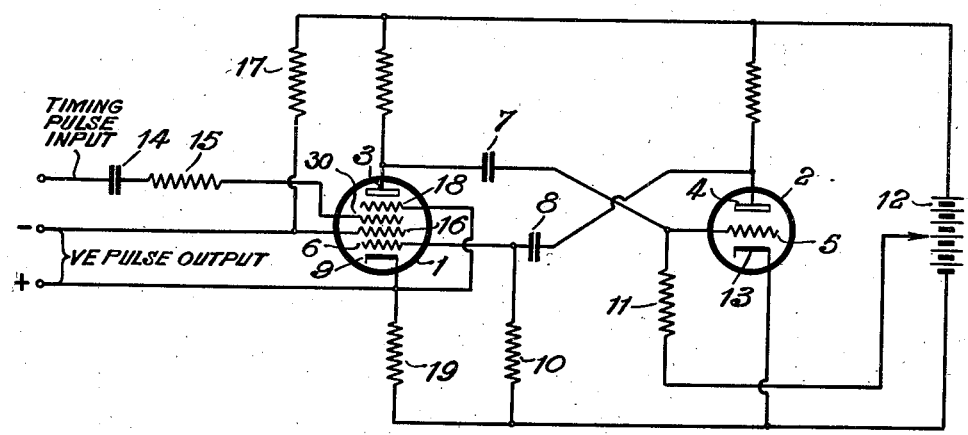

Figure 5 shows another embodiment of my invention.

Referring to Figure 1 the valves 1 and 2 have their anodes 3 and 4 connected to the opposite grids 5 and 6 respectively, through condensers 7 and 8. The grid 6 is connected to the cathode 9 of the valve 1 by means of the resistance 10, while the grid 5 of valve 2 is taken through a resistance 11 to a point on the source of potential 12, the negative terminal of which is connected to the cathode 13 of the valve 2. The time constant of the condenser-resistance combination 8, 10 is made long compared with the period of the pulses which is determined by the controlling pulses supplied. Controlling pulses of the type shown in Figure 2a are applied to the anode 3 of valve 1 by means of the condenser 14 connected in series with the resistance 15 as made clear in Figure 1.

As the time constant of the resistance 11 and condenser 7 is small the valve 2 after any disturbance in its grid circuit will quickly return to a conducting condition in virtue of the positive bias applied to its grid through the resistance 11. If this disturbance were of the character of one of the negative impulses shown in Figure 2a, then the effect had on valve 1 would be to drive its grid 6 suddenly positive and thereby to collect on this grid a considerable negative charge, which after the passage of the impulse, and in virtue of the large time constant of the condenser 8 and resistance 10, would maintain the valve 1 in a non-conducting condition for a relatively long period. Thus after the application of a negative impulse to the system the valve 2 quickly returns to a conducting state and the valve 1 for a considerable period remains non-conducting. In operation it is arranged by making the time constant of the grid circuit of valve 1 sufficiently great, that a second negative controlling impulse arrives before valve 1 becomes again conducting. Thus positive impulses on the anode of valve 2 and negative impulses on the anode of valve 1 of an equal duration, the duration depending on the time constant of the grid circuit of valve 2 and on the grid biassing potential to the grid 5, are made to appear in synchronism with the controlling impulses.

While, however, a consideration of the cycle of events will make it apparent that the more positive parts of the waveform on both anodes is of the simplest rectangular character, except as noted below, it will be appreciated that in a negative direction there are departures from this form. Thus to the negative impulses on the anode of valve 1 there are always added the negative synchronising impulses, so that the waveform on this anode is like that shown in Figure 2b. Further at the end of the pulse on the anode of valve 1, the grid 5 of valve 2 receives a positive surge which, however, quickly disappears due to the small time constant associated with this grid. The waveform at the anode of valve 2, is, therefore, made to depart from a simple rectangular shape and includes the negative excursion that is shown in Figure 2c. Due to this grid current load across the anode resistance of valve 1 there is also a slight roundedness of the positive swing on anode 3, as shown in Figure 2b.

In Figure 3 a circuit very similar to that shown in Figure 1, and in which like parts are designated by the same reference numerals, is shown possessing certain modifications in accordance with the invention, by which the waveforms of Figures 2b and 2c may be produced without, however, the undesired negative excursions being present. In this example, the valve 1 possesses, besides the control grid 6, a grid 16 connected to the source of supply 12 by means of the resistance 17, and a further grid 18 connected directly to the cathode 9 in the same envelope. In the cathode lead of the valve 1 there is connected the resistance 19.

The circuit functions in the same manner as that shown in Figure 1 except that as in the valve 1 the anode is able to exert little influence on the electron stream due to the presence of at least one extra grid, the timing impulses are only impressed to a negligible extent upon the current passed by this valve. Any impulses that may be derived from the electrodes of valve 1, apart from the anode, are therefore substantially free from the influence exerted by the synchronising impulses and the grid current of valve 2, and in particular the waveform that appears on the grid 16 will be the waveform that is shown in Figure 2b, but with the negative excursion and the roundness of the positive swing shown therein, removed as illustrated in Figure 4b. Since moreover, the valve 1 is non-conducting except when an impulse is applied to its control grid 6, it follows that the waveform at its cathode 9 will be of the same character as that on the anode of valve 2, this waveform being as shown in Figure 2c, except also that the negative excursion is omitted. A wave shape like that illustrated in Figure 4c is therefore obtained at the cathode of valve 1.

It will be appreciated of course that if only the waveform shown in Figure 4b is required then it is permissible to omit the cathode resistance 19, while on the other hand if only that shown in Figure 4c is needed, the resistance 17 may be omitted. It will further be appreciated that the valve 2 may have more than the single grid shown in Figure 3 and that of course many other minor modifications are permissible without departing from the scope of the invention. For example, the timing pulses need not be applied to the anode of valve 1 as shown in Figure 3 but to a grid located suitably within the valve, which of course is not necessarily a pentode, though shown as such in Figure 3, but is merely a valve with a characteristic of similar nature. Where the timing pulses are applied to a suitable grid it will be appreciated that the anode may be used as an output electrode, though if the anode is still used as coupling electrode to valve 2 the effect of grid current in valve 2 will still be present.

If desired, the valve 2 may be provided with a further electrode in addition to the input electrode 5 shown and arranged in the electron stream between the electrode 5 and anode 4 and the timing pulses may be applied directly to this additional input electrode instead of being first applied to the anode of valve 1; in this case, instead of obtaining a negative pulse output from the screen grid of valve 1, a negative pulse output substantially free from excursions can be obtained from the anode of valve 1.

Referring to Fig. 5, there is shown a further embodiment of my invention in which the timing pulses which ordinarily are impressed on the anode-cathode path of the tube as illustrated in Figs. 1 and 3 is, in this case, impressed on a control electrode-cathode path of the tube. The illustration in this figure merely shows one additional grid in the tube 1 that has been illustrated in the previous figures, and similar numerals refer to similar elements in the two figures, the additional grid being identified by the numeral 30.

I claim:

1. A multivibrator oscillation generator comprising a first thermionic tube having anode, cathode and a plurality of grid electrodes, a second thermionic tube having anode, cathode and at least one grid electrode, means cross-connecting the anode of each of said thermionic tubes to a grid electrode of the other tube, means for impressing impulses from a source external to the generator for affecting the current flow through said first thermionic tube, impedance means connected in the anode-cathode path and in a grid electrode-cathode path of said first thermionic tube, and an output circuit for said generator having one terminal thereof connected between the cathode and said latter named impedance means and the other terminal thereof connected to another grid electrode of said first thermionic tube.

2. Apparatus in accordance with claim 1, wherein the impedance means connected in the anode-cathode path and in a grid electrode-cathode path of said first thermionic tube comprises a resistor.

3. Apparatus in accordance with claim 1, wherein said pulses external to said generator and impressed on said thermionic tube are impressed on the anode-cathode path thereof.

4. Apparatus in accordance with claim 1, wherein said pulses external to said generator and impressed on said thermionic tube are impressed on a grid electrode-cathode path thereof.

ERIC LAWRENCE CASLING WHITE.